March 13, 1962  V. P. HEAD  3,024,654
HIGH-CAPACITY ROTAMETER

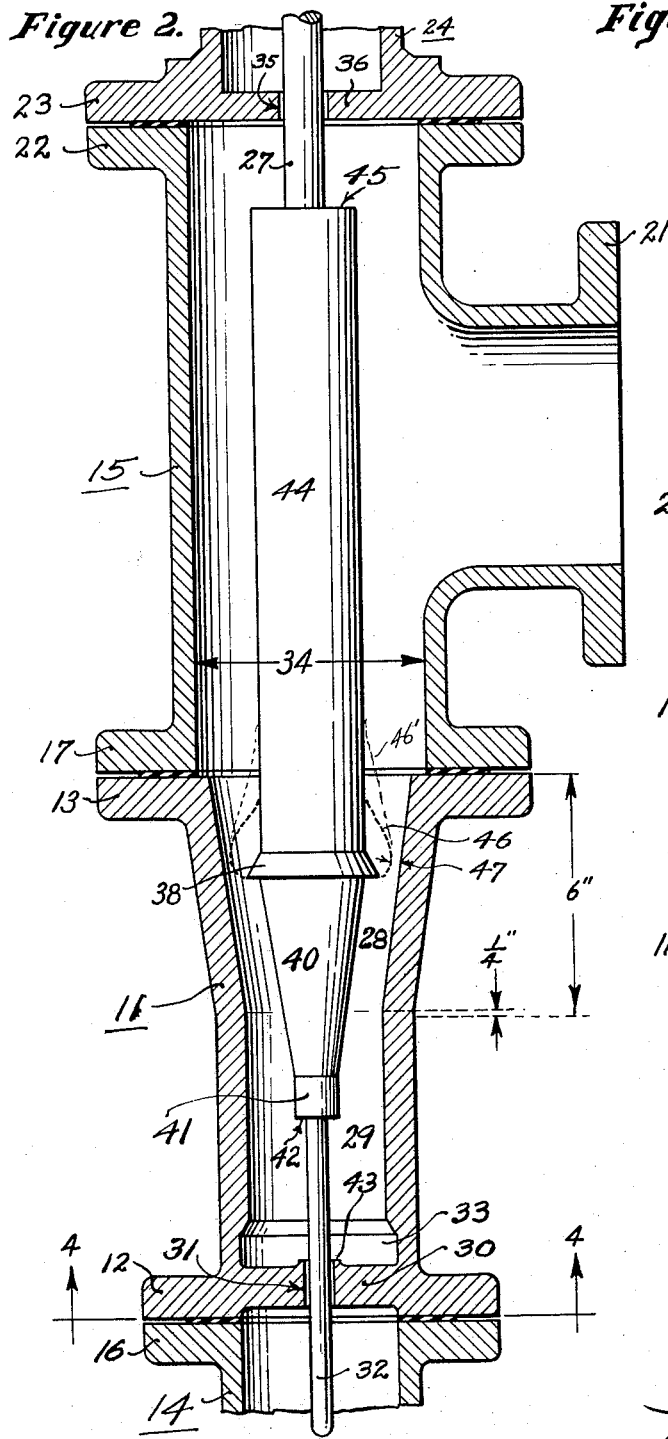
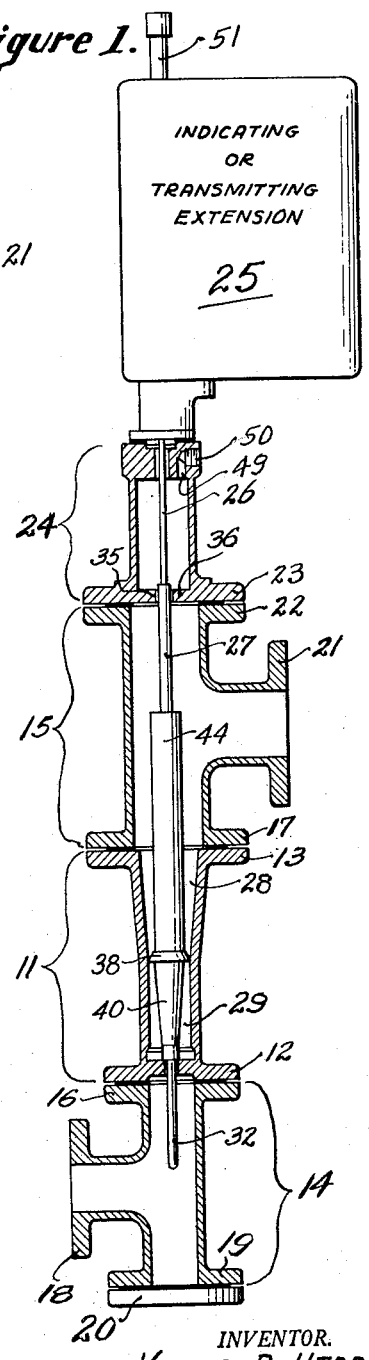

Filed Sept. 4, 1956  2 Sheets-Sheet 2

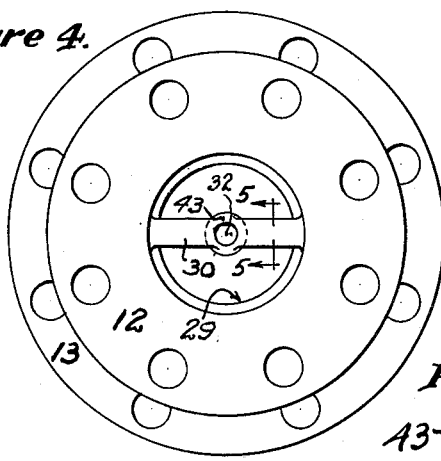

Figure 4.

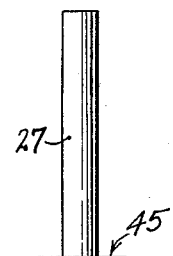

Figure 3.

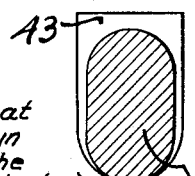

Figure 5.

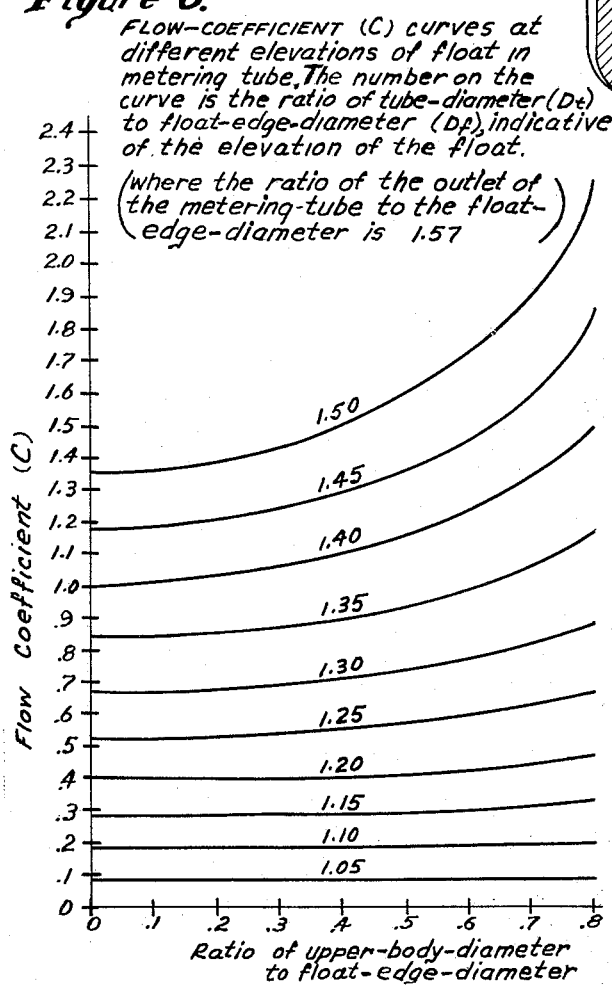

Figure 6.
FLOW-COEFFICIENT (C) curves at different elevations of float in metering tube. The number on the curve is the ratio of tube-diameter (Dt) to float-edge-diameter (Df), indicative of the elevation of the float.

(where the ratio of the outlet of the metering-tube to the float-edge-diameter is 1.57)

INVENTOR.
VICTOR P. HEAD
BY Leonard L. Kalish
ATTORNEY.

United States Patent Office 3,024,654
Patented Mar. 13, 1962

3,024,654
HIGH-CAPACITY ROTAMETER
Victor P. Head, Hatboro, Pa., assignor to Fischer & Porter Company, Hatboro, Pa., a corporation of Pennsylvania
Filed Sept. 4, 1956, Ser. No. 607,845
10 Claims. (Cl. 73—209)

The present invention relates to certain improvements in variable-area type rate-of-flow meters; variable-area type rate-of-flow meters being sometimes called "rotameters."

The present invention relates more particularly to rotameters of high capacity or to rotameter conditions producing a high Reynolds number (as, for instance, Reynolds numbers upwards of 2000), and has little if any applicability to rotameter conditions productive of low Reynolds number where laminar flow exists.

I have discovered that the capacity or meter-maximum of rotameters under relatively high Reynolds number conditions can be materially increased without increasing the size or angle of the metering-tube or the edge-diameter of the float and without correspondingly increasing the weight of the float, and without incurring any undue pressure-loss such as would be occasioned by increasing the meter-capacity by other means, and furthermore that the pressure-recovery can be increased in relation to the rate-of-flow, namely, a substantially increased rate-of-flow can be obtained without a proportionately increased pressure-loss, that is, with only a comparatively small increase in pressure-loss as contrasted with the greatly increased flow-rate.

I have discovered that these desiderata can be obtained under rotameter conditions of high Reynolds numbers by the float-structure and by the relationship or disposition of such float structure to the outlet passageway leading from the metering-tube, hereinbelow described in reference to the accompanying drawings.

The accompanying drawings in which like reference characters indicate like parts, FIGURE 1 represents a vertical cross-sectional view of one embodiment of a rotameter of the present invention; this figure being on a much reduced scale and not to exact scale, and the proportions shown in this figure are intended to be only illustrative (reference being had to the detailed description to indicate the proportions and the variability of the proportions).

FIGURE 2 represents a cross-sectional view of a portion of the structure shown in FIGURE 1, but on a scale larger than that shown in FIGURE 1; this figure being approximately to the full scale of a small size rotameter embodying the present invention.

FIGURE 3 represents an elevational view of a float representing one embodiment of my invention, including the upper float-body or pressure-force-member and the upper and lower guide-rods (but omitting the extension-rod leading from the upper guide-rod to the indicating or transmitting means associated with the rotameter).

FIGURE 4 represents a cross-sectional view on line 4—4 on FIGURE 2.

FIGURE 5 represents a cross-sectional view on line 5—5 of FIGURE 4, on a much enlarged scale.

FIGURE 6 is a graph of a series of flow-coefficient curves; showing the variations or changes in flow-coefficient (C) at different positions of the float-edge in its vertical travel-path within the metering-tube with different ratios of upper-float-body diameter to float-edge diameter, to show to what extent the flow-coefficient (and hence the rate-of-flow) increases at any position of the float in the metering-tube by increasing the diameter of the upper float-body, over and above such rate-of-flows as would result from the same float-weight without the present invention, and the flow-coefficients (C) shown by these curves reflect the increases in rate-of-flow due to my present invention (the float-positions, for which the successive curves are shown, being indicated by the ratio of the diameter of the tube, at the level of the float-edge, to the diameter of the float-edge).

It has long been known in the rotameter art that the capacity of the meter or meter-maximum can be increased by increasing the weight of the float (with the angle or taper of the tube remaining the same and with the upper diameter of the metering tube and the float-edge diameter also remaining the same). However, with every increase in the weight of the float a corresponding increase in pressure-loss must be suffered. This is a serious disadvantage in many if not in most situations where rate-of-flow is to be measured. Moreover, in large-size rotameters, this method of increasing the meter-maximum (and the range of the meter) also carries with it the substantial disadvantage of an excessively heavy float which is not only more difficult to handle because of its excessive weight, but also involves greatly increased material costs and production costs because in many uses the float must be made of stainless steel or other costly materials, and also introduces some operational problems because such excessively heavy floats impose additional structural problems due to the necessity for bringing such a heavy float to such a sudden stop at either the upper or lower limits of its intended travel.

Thus, by way of example, the weight of a float of a rotameter to take the full flow through an 8-inch pipe-line with a maximum capacity of 5,000 gallons of water per minute would be approximately 510 pounds without the use of my present invention and would be only approximately 185 pounds with the use of my present invention (metering-tube size and taper and float-edge diameter remaining the same). In addition, this greatly increased weight of the float also produces a pressure loss, over and above the pressure loss incident to the same meter-maximum when using my invention.

Conversely, a 185-pound float of conventional construction in a conventional rotameter (with all other dimensions being the same) would provide a meter-maximum of only approximately 3,000 gallons of water per minute.

The present invention is intended for large rotameters, particularly for installation directly into pipe-lines of relatively large diameter, as, for instance, pipe-lines of 2 inches and larger in internal diameter.

While my present invention may be embodied in other forms than those shown or indicated by the foregoing drawings and the following description, these drawings show one of the preferred embodiments of my invention, wherein the metering-tube, designated generally by the numeral 11, is formed of metal and has a lower coupling flange 12 and an upper coupling flange 13, each provided with suitable bolt-holes therethrough (shown in FIGURE 4) for securement to the juxtaposed coupling flanges 16 and 17 of the lower and upper pipe-T's 14 and 15. The lower pipe-T 14 is provided with an inlet flange 18 to which the flanged end of the up-stream side of a pipe-line may be connected (where the end of the upstream pipe is horizontal), and is also provided with a bottom coupling flange 19 to which a cap or closure plate 20 may be secured to close off the lower opening which may serve as a clean-out opening. Where the end of the upstream pipe is vertical, the lower pipe-T 14 may be eliminated and the end of such vertical upstream pipe may be connected directly to the inlet flange 12 through a corresponding coupling flange on the end of the pipe.

The upper pipe-T is provided with an outlet flange 21 at 90° to its flange 17 and is provided with an instrument-mounting flange 22 parallel to the flange 17 and adapted to receive the coupling flange 23 of the upper float-guide and instrument-mounting member 24. Sealing-gaskets are interposed between connected coupling flanges.

On top of the generally tubular member 24 any suitable visual-indicator or transmitting instrument is mounted; generally designated by the numeral 25. This indicator or transmitter 25 being any suitable indicator or transmitter, its details are not shown in the drawings nor herein set out because such indicators and transmitters are well known in the art, and hence the inclusion of such details is believed unnecessary. The extension-rod 26, which extends upwardly from the float-guide-rod 27, enters a tubular chamber forming a part of such indicator or transmitter 25, and the movement of such extension-rod within such instrument-chamber operates any one of several types of visible flow-rate indicators or transmitters (the latter for transmitting to some distant point the flow-rate reflected by the float position); such chamber within the instrument being in fluid communication with the interior of the member 24 and with the interior of the T 15 and sealed in respect to the atmosphere.

The metering-tube 11 includes an upper conical tapered metering chamber 28 and a lower cylindrical approach chamber 29, and a lower float guide and stop member 30 having a central vertical guide opening 31 therein, through which the lower float-guide-rod 32 extends and in which it is slidably guided. The float guide and stop member 30 is preferably generally flat, with rounded upper and lower edges (as shown in cross-section in FIGURE 5), and its two generally flat lateral arms, extend from the center to diametrically opposite sides of the inlet-opening 33, also serve to straighten out the flow, so that as the liquid ascends through the cylindrical approach-chamber 29, its flow pattern will be substantially straight and generally free of swirls and other effects of upstream piping.

The inner diameter 34 of the upper T 15 may be made somewhat larger than the inner diameter of the upper end of the tapered metering chamber 28. By making the inlet diameter 34 of the T 15 somewhat larger than the uppermost diameter of the tapered metering chamber 28, it is possible to keep down the length of the metering chamber 28. In either event, however, the uppermost half-inch or so of the length of the tapered metering chamber is not included in the calibrated or flow-measurement range of travel of the metering-edge of the float, even though the float-edge may be permitted to rise above such point or indeed above the top of the tapered metering chamber, to permit the flow of liquid beyond the metering range of the rotameter. Likewise, a quarter-inch or so of the uppermost portion of the cylindrical approach-chamber 29 may be included in the lower limit of travel of the metering-edge of the float. The circular juncture between the wall of the approach-chamber 29 and the wall of the metering chamber 28 may be slightly rounded off (in vertical cross-section).

The flange 23 of the upper member 24 is provided with a central opening 35, into which the upper float-guide-rod 27 extends and by which it is guided; the guide-opening 35 being either slightly larger than the diameter of the guide-rod 27, so as to provide liquid-communication between the interior of the T 15 and the interior of the member 24, or one or several separate communicating passageways may be provided through the innermost portion of the flange-wall or disc 36 which is formed in continuation of flange 23. The disc 36 also serves as the upper float-stop.

The float, designated generally by the numeral 37, includes a metering-head 38 of generally frusto-conical form with the base-diameter thereof, indicated by the arrow 39 constituting its metering-edge, sometimes hereinafter referred to as the "edge" or "float-edge." While this portion 39 is referred to as the "edge," it is a cylinder with a very small axial dimension; the width of this cylindrical "edge" being generally of the order of one one-hundredth of its diameter.

Beneath the metering-edge 39 is an inverted frusto-conical flow-approach portion 40 whose uppermost and largest diameter (immediately adjacent to the head 38) is preferably of a diameter approximately 0.8 of the diameter of the float-edge 39.

Beneath the flow-approach portion 40 of float 37 is a generally cylindrical portion 41 of a diameter generally the same as the lowermost diameter of the flow-approach member 40; each of which diameters is preferably the smallest possible which will still give a sufficient shoulder 42 for a bottom-rest for the float and allow for a sufficient thickness for the lower guide-rod 32 to prevent its flexing in operation.

Beneath the cylindrical member 41 is the lower float-guide-rod 32, the diameter of which is sufficiently smaller than the diameter of the portion 41 to provide the shoulder 42 for abutting against the central boss 43 on top of the float-stop 30 when there is no flow or not sufficient flow to activate the meter; the abutment of the shoulder 42 against the boss 43 determining the lower limit of float-travel. The diameter of the lower float-guide-rod may be a tenth to an eighth (more or less) the diameter of the float-edge, and the diameter of the portion 41 may be a fifth to a quarter of the diameter of the float-edge.

Above the metering head 38 a generally cylindrical upper float-body 44 is provided, and above such upper float body the upper float-guide-rod 27 is provided. The annular shoulder 45 between the upper float body 44 and the upper float-guide-rod 27 is adapted to abut against the under surface of the inner disc or wall 36 of the member 24 when the float is in its uppermost position, namely, when the flow exceeds the maximum for which the rotameter is intended; such abutment serving to determine the upper limit of float-travel.

The diameter of the upper float-guide-rod 27 (as the diameter lower float-guide-rod 32) is kept to the minimum which will give adequate guidance to the float without flexing while in operation. A quarter to a third (or even slightly more) of the diameter of the float-edge may be required for the diameter of the rod 27.

While, as shown in FIGURES 1, 2 and 3, the diameter of the upper float body 44 is approximately 8-tenths of the diameter of the float-edge 39, this diameter is to be varied according to the flow-capacity desired for a meter having otherwise the same dimensions. The greater this diameter the greater the capacity, as indicated in FIGURE 6. However, an upper-body diameter substantially greater than 0.8 of the float-edge diameter tends to introduce undesirable effects.

The two dotted lines 46, commencing at the float-edge 39 and extending upwardly therefrom and merging into the sidewall of the upper float-body 44, are intended to represent the flow-pattern above the metering-edge or float-edge 39. While the exact shape of such flow-pattern cannot be accurately ascertained and the flow-pattern lines 46 are not intended to suggest that the flow-pattern is necessarily just like that indicated by these lines, nevertheless these lines are representative of the flow-pattern above the edge 39, in the sense that all the fluid passing the edge 39 moves upwardly in an annulus-shaped jet whose inner diameter increases for some little distance above the float-edge 39 and then gradually decreases until it meets the diameter of the upper float-body 44; the space inside the lines 46, or inside this annulus-shaped jet, being occupied by fluid which is relatively stagnant in the sense that it is not moving onwardly with the main stream, although it may and does undergo some turbulence within itself.

The point at which the cross-sectional area of the annulus-shaped jet is the smallest, namely, at the point sometimes referred to as the vena contracta, the fluid velocity is the greatest and the pressure is the lowest. From the vena contracta, indicated by the arrows 47, the cross-sectional area of the flow-stream or jet gradually increases, with a corresponding reduction in its velocity and a generally corresponding increase in its pressure.

The length of the upper float body 44 is such that it extends well into this region of increased pressure. Preferably this length will be at least sufficient to dispose its upper end 45 above the upper end of the metering tube when the float is resting at the lower limit of its travel. The excess of recovered pressure over the pressure just above the float-edge 39 acts upon the area of the upper body 44 to produce the downward force which accounts for the increase in flow-coefficient achieved by my invention. The magnitude of the recovered pressure so acting is calculable from the familiar hydraulic relationship for flow through sudden enlargements, $$\frac{\text{Pressure rise}}{\text{jet velocity-pressure}} = 2\frac{A_j}{A_m}\left(1 - \frac{A_j}{A_m}\right)$$

where $A_j$ is the area of a jet issuing into an enlarged flow region, and $A_m$ is the final full-flow area or the area of such enlarged region. In my invention, $A_j$ becomes the area of the annular vena contracta, and the area $A_m$ becomes the area between the upper float-body 44 and the top of the metering-chamber 28. Preferably, the upper float-body 44 is extended into the top stagnant region of the upper T 15 where an essentially zero velocity is found and where a maximum down-stream pressure (a little higher than the calculated down-stream pressure) is found.

The T 14 and the T 15 are standard.

I prefer to have the upper or outlet T larger than the lower or inlet T.

In the following table I have indicated the relationship between the inlet T and the outlet T.

*Illustrative diameters—with the axial dimensions (shown in the drawings) remaining constant*

| size of inlet T14 inches | 1½ | 2 | 3 | 4 | 6 | 8 |
|---|---|---|---|---|---|---|
| size of outlet T15 inches | 2 | 3 | 4 | 6 | 8 | 12 |
| diameter of metering-edge 39 inches | 1.111 | 1.667 | 2.222 | 3.333 | 4.444 | 6.666 |

The diameter of the flow-approach chamber 29, and hence the diameter of the smaller or inlet end of the metering chamber 28 is preferably slightly greater than the diameter of the metering-edge 39. Thus, for instance, the diameter of the chamber 29 and of the lowermost end of the chamber 28 (that is in the circle where the taper of the chamber 28 intersects the cylindrical surface of the chamber 29) may be 1.01 to 1.06 times the diameter of the metering-edge 39, and I have found 1.04 times the metering-edge-diameter to be satisfactory.

The uppermost or largest diameter of the tapered metering chamber 28 is approximately one and one-half times the diameter of the metering-edge 39; the rotameters built according to the present invention having had this uppermost diameter of the tapered metering chamber 1.572 times the diameter of the metering-edge 39.

I have found that by keeping the length or axial dimension of the metering chamber 28 and of the metering-head 38, flow-approach member 40 and stop member 41 constant, namely, at the dimensions shown in the drawings, and varying the diameters as above indicated, I can obtain different size rotameters, and within each of these sizes I can then vary capacity or meter-maximum by varying the diameter of the upper float-body 44 from approximately two-tenths or three-tenths of the metering-edge diameter, for the lower meter-maximum to approximately eight-tenths of the metering-edge diameter, for the upper or highest meter-maximum.

I also prefer, in most if not in all instances, to have the lower end of the scale correspond to that position of the metering-edge 39 in the tapered metering chamber 28, where the diameter of such metering chamber is 1.05 times the diameter of the metering-edge 39, and to have the upper end of the scale correspond to that position of the metering-edge 39 in the tapered metering chamber 28, where the diameter of the metering chamber is 1.50 times the diameter of the metering-edge 39 (although, of course, these upper and lower scale positions can be varied).

In the accompanying drawings I have shown another flow-pattern line 46′, to indicate the possible variations in flow-pattern.

At the top of the member 28 a vent opening 49 may be provided, communicating with a lateral threaded hole 50, into which a stopcock or valve may be connected, for venting the chamber within the member 26 and also for venting the top of the T 15, so as to remove or purge therefrom any accumulated gases.

Having described my invention, I claim the following:

1. A variable-area type rate-of-flow meter including a generally upright metering chamber whose diameter gradually increases from its lower inlet end to its upper outlet-end, an enlarged upwardly-extending flow-passage above said metering chamber, a float within said metering chamber, said float including a jet-producing metering-head and a pressure-force member above and having its lower end adjacent said metering-head and extending upwardly therefrom into and having its upper end disposed within the zone of recovered pressure in said flow-passage in all operative positions of said metering-head and being of a substantial diameter in relation to the diameter of the metering-head, the diameter of said pressure-force member being selected according to the maximum metering capacity desired, a guide-rod extending downwardly from said metering-head below said metering-chamber and a guide-rod extending upwardly from said pressure-force member and being of a diameter substantially smaller than the diameter of said pressure-force member, said metering-head, pressure-force member and guide-rods being arranged to be maintained in coaxial relation with each other at all times and to move up and down together as a unit, a lower stationary guide for said lower guide-rod and an upper stationary guide for said upper guide-rod.

2. A variable-area type rate-of-flow meter including a generally upright metering chamber whose diameter gradually increases from its lower inlet-end to its upper outlet-end, an upwardly-extending flow-passage above said metering chamber in which (flow-passage) the recovered portion of the velocity-pressure is converted to static-pressure, a float within said metering chamber, means for guiding said float for free vertical coaxial up and down movement within said metering chamber, said float including a jet-producing metering-head and a pressure-force member above said metering-head and extending upwardly therefrom into and having its upper end disposed within the zone of recovered pressure in said flow-passage in all operative positions of said metering-head and being of a substantial diameter in relation to the diameter of the metering-head; the diameter of said pressure-force member being selected according to the maximum metering capacity desired.

3. A variable-area type rate-of-flow meter including a generally upright metering chamber whose diameter gradually increases from its lower inlet-end to its upper outlet-end, an enlarged upwardly-extending flow-passage above said metering chamber, a float within said metering chamber, said float including a jet-producing metering-head whose under-surface in an annular zone adjacent its metering-edge is shaped so as to suddenly direct the flow (past the float) outwardly, and a pressure-force member above and having its lower end adjacent said metering-head and extending upwardly therefrom into and having its upper end disposed within the zone of recovered pressure in said flow-passage in all operative positions of said metering-head and being of a substantial diameter in relation to the diameter of the meter-head, the diameter of said pressure-force member being selected according to the maximum metering capacity desired, a guide-rod extending downwardly from said metering-head below said metering-chamber and a guide-rod extending upwardly from said pressure-force member and being of a diameter substantially smaller than the diameter of said pressure-force member, said meter-head, pressure-force member and guide-rods being arranged to be maintained in coaxial relation with each other at all times and to move up and down together as a unit, a lower stationary guide for said lower guide-rod and an upper stationary guide for said upper guide-rod.

4. A variable-area type rate-of-flow meter including a generally upright metering chamber whose diameter gradually increases from its lower inlet-end to its upper outlet-end, an upwardly-extending flow-passage above said metering chamber in which (flow-passage) the recovered portion of the velocity-pressure is converted to static-pressure, a float within said metering chamber, means for guiding said float for free vertical coaxial up and down movement within said metering chamber, said float including a jet-producing metering-head whose under-surface in an annular zone adjacent its metering-edge is shaped so as to suddenly direct the flow (past the float) outwardly, and a pressure-force member above and having its lower end adjacent said metering-head and extending upwardly therefrom into and having its upper end disposed within the zone of recovered pressure in said flow-passage in all operative positions of said metering-head and being of a substantial diameter in relation to the diameter of the metering-head; the diameter of said pressure-force member being selected according to the maximum metering capacity desired.

5. A variable-area type rate-of-flow meter including a generally upright metering chamber whose diameter gradually increases from its lower inlet-end to its upper outlet-end, an enlarged upwardly-extending flow-passage above said metering chamber, a float within said metering chamber, means for guiding said float for free vertical coaxial up and down movement within said metering chamber, said float including a jet-producing metering-head having a generally flat annular under-surface adjacent its metering-edge and a pressure-force member above said metering-head and extending upwardly therefrom into and having its upper end disposed within the zone of recovered pressure in said flow-passage in all operative positions of said metering-head and being of a substantial diameter in relation to the diameter of the metering-head; the diameter of said pressure-force member being selected according to the maximum metering capacity desired.

6. A variable-area type rate-of-flow meter including a generally upright metering chamber whose diameter gradually increases from its lower inlet-end to its upper outlet-end, an enlarged upwardly-extending flow-passage above said metering chamber, a float within said metering chamber, said float including a thin edged jet-producing metering-head and a pressure-force member above and having its lower end adjacent said metering-head and extending upwardly therefrom into and having its upper end disposed within the zone of recovered pressure in said flow-passage in all operative positions of said metering-head and being of a substantial diameter in relation to the diameter of the metering-head; the diameter of said pressure-force member being selected according to the maximum metering capacity desired, a guide-rod extending downwardly from said metering-head below said metering-chamber and a guide-rod extending upwardly from said pressure-force member and being of a diameter substantially smaller than the diameter of said pressure-force member, said metering-head, pressure-force member and guide-rods being arranged to be maintained in coaxial relation with each other at all times and to move up and down together as a unit, a lower stationary guide for said lower guide-rod and an upper stationary guide for said upper guide-rod.

7. A variable-area type rate-of-flow meter including a generally upright metering chamber whose diameter gradually increases from its lower inlet-end to its upper outlet-end, an enlarged upwardly-extending flow-passage above said metering chamber, a float within said metering chamber, means for guiding said float for free vertical coaxial up and down movement within said metering chamber, said float including a jet-producing metering-head, a flow-approach member beneath said metering-head, the diameter of said flow-approach member increasing from its lower end to its upper end, and a pressure-force member above and having its lower end adjacent said metering-head and extending upwardly therefrom into the zone of recovered pressure and being of a substantial diameter in relation to the diameter of the metering-head; the diameter of said pressure-force member being selected according to the maximum metering capacity desired.

8. A variable-area type rate-of-flow meter including a generally upright metering chamber whose diameter gradually increases from its lower inlet-end to its upper outlet-end, an enlarged upwardly-extending flow-passage above said metering chamber, a float within said metering chamber, means for guiding said float for free vertical coaxial up and down movement within said metering chamber, said float including a jet-producing metering-head and a pressure-force member above and having its lower end adjacent said metering-head and extending upwardly therefrom into a zone of recovered pressure in said upwardly-extending flow-passage, the diameter of said pressure-force member being more than half the diameter of said metering-head and extending from said metering head upwardly to a distance such that its upper end will be in the zone of recovered pressure within said upwardly-extending flow-passage above the metering chamber in all positions of the metering head and pressure-force member.

9. A variable-area type rate-of-flow meter including a generally upright metering chamber whose diameter gradually increases from its lower inlet-end to its upper outlet-end, an enlarged upwardly-extending flow-passage above said metering chamber, a float within said metering chamber, means for guiding said float for free vertical coaxial up and down movement within said metering chamber, said float including a jet-producing metering-head and a pressure-force member above and having its lower end adjacent said metering head and extending upwardly therefrom into and having its upper end dispose within a zone of recovered pressure in said upwardly-extending flow-passage in all operative positions of said metering-head, the effective diameter of said upwardly-extending flow passage in relation to the diameter of the metering head being such that a substantial pressure-recovery is achieved therein in relation to the pressure in the jet just above the metering head.

10. A variable-area type rate-of-flow meter including a generally upright metering chamber whose effective cross-sectional area gradually increases from its lower inlet-end to its upper outlet-end, a recovered-pressure chamber above said metering chamber and in free communication therewith, a float within said metering chamber, float-guiding means below said float and float-guiding means above said float for guiding said float for free vertical coaxial up and down movement within said metering chamber, said float including a jet-producing metering-head and a pressure-force member above and having its lower end adjacent said metering-head and extending upwardly therefrom into said recovered-pressure chamber and having a diameter substantially greater than the diameter of said float-guiding means above the float and substantially smaller than the diameter of said metering-head, at least said upper float-guide means including a guide-rod extending from and rigidly connected with the pressure-force member of the float and a stationary rod-guide surrounding said guide-rod.

References Cited in the file of this patent

UNITED STATES PATENTS

| | | |
|---|---|---|
| 1,215,129 | Edlich | Feb. 6, 1917 |
| 2,388,672 | Brewer | Nov. 13, 1945 |
| 2,411,330 | Melas et al. | Nov. 19, 1946 |
| 2,458,637 | Pratt et al. | Jan. 11, 1949 |